INVENTORS
EDWARD M. EMERY
GERALD M. GASSER

BY J.E. Maurer
ATTORNEY

No. 870,585
Int. Cl. B01d 15/08
U.S. Cl. 55—67                                 9 Claims

ABSTRACT OF THE DISCLOSURE

Method for analysis of mixtures containing naphthalene and alkyl-substituted naphthalene isomers by gas-liquid chromatography using certain polyphenyl thioethers, polyphenyl ether-thioethers or phenylmercaptobiphenyl compounds as absorbents.

---

This application is a continuation-in-part of copending application Ser. No. 616,277, filed Feb. 15, 1967, now abandoned.

This invention relates to a method for the analysis of mixtures containing naphthalene and alkyl-substituted naphthalene isomers by gas-liquid chromatography and in particular relates to such an analysis employing therein an improved liquid-phase absorbent composed of certain polyphenyl thioethers and/or mixed polyphenyl ethers-thioethers and/or phenylmercaptobiphenyl compounds.

The analysis of coal tar and other materials containing mixtures of compounds including naphthalene and alkyl-substituted naphthalenes as well as biphenyl and alkyl-substituted biphenyls is a very difficult problem because of the similar physical properties of such compounds. With the advent of gas-liquid chromatography, some advance was made in analysis of such mixtures; however, no completely satisfactory analysis has heretofore been readily accomplished with gas-liquid chromatography because of the lack of a suitable column coating or packing. With the prior art coatings the peaks obtained have been poorly shaped and in many instances the peaks for each separate isomer have not been realized. Thus, even when using one of the coatings which has heretofore been found to be reasonably effective for analysis of such mixtures, e.g., the polyphenyl ethers having five to seven aromatic rings, such as m-bis(m-phenoxyphenoxy) benzene, complete resolution cannot be obtained between 2,3-, 1,4-, and 2,5-dimethyl naphthalenes, nor between 2,6- and 2,7-dimethyl naphthalenes and biphenyl.

It is, therefore, an object of this invention to provide an improved coating or packing for gas-liquid chromatography columns which provides properly shaped peaks and good resolution in anlyzing mixtures containing naphthalene and alkyl-substituted naphthalenes such as coal tar, and such mixtures which also contain biphenyl and/or alkyl-substituted biphenyl. Another object of this invention is to provide an absorbent for gas-liquid chromatographic columns which is sufficiently high boiling so as not to be eluted from the columns under the conditions necessary for the analysis of the mixtures referred to. These and other objects will be apparent from the following description of the invention.

It has now been found that naphthalene and alkyl-substituted naphthalene-containing mixtures can be readily and effectively analyzed by gas-liquid chromatography using as the liquid phase of a gas-liquid chromatographic column a polyphenyl thioether represented by the structure (I) 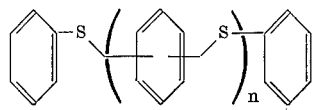

where $n$ is a whole number from 3 to 7, or a mixed polyphenyl ether-thioether represented by the structure (II) 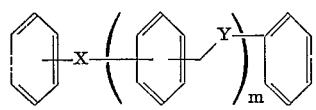

where $m$ is a whole number from 3 to 7 and X and Y are each O or S, at least one of X or Y being O provided, however, that the number of the S's in the sum of $X+Y$ is at least one-third of such sum and preferably at least one-half of such sum, or a mixed polyphenyl ether-thioether represented by the structure (III) 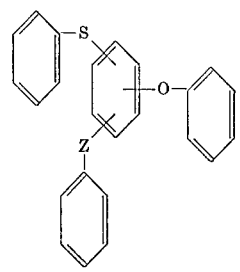

where Z is O or S, or a phenylmercaptobiphenyl or mixed phenylmercapto-phenoxy biphenyl compound represented by the structure (IV) 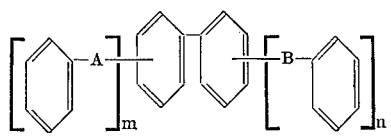

where A and B are each independently O or S; provided that the number of S atoms in the sum of $A+B$ is at least one-third and preferably one-half of such sum and $m$ and $n$ are whole numbers from 0 to 3 and the sum of $m+n$ is from 2 to 6.

In addition to the foregoing compounds, the phenyl and phenylene groups of such compounds can contain substituents, such as alkyl of 1 to 4 carbon atoms, alkoxy of 1 to 4 carbon atoms, halogen, phenyl and perfluoroalkyl of 1 to 4 carbon atoms. Typical examples of such compounds are those of United States Pat. Nos. 3,098,-104; 3,098,105; 3,100,801; 3,114,777 and 3,124,619.

Mixtures of the compounds described above can also be used. For convenience, the polyphenyl thioethers, mixed polyphenyl ethers-thioethers and biphenyl compounds and their substituted derivatives are referred to herein merely as "polyphenyl thioethers."

The polyphenyl thioethers are viscous, in some cases almost solid, materials at room temperature but by raising their temperatures they become sufficiently liquid to enable their use in connection with the present invention, that is, they can be made sufficiently liquid to enable their use as the liquid phase of a gas-liquid chromatographic column. Thus, the term "liquid phase" as used herein refers to the absorbent of the chromatographic column whether an ingredient of the packing, on the support or in a separate liquid layer and regardless of whether it be liquid or solid at the temperature at which the gas-liquid chromatographic analysis is performed.

Obviously, in addition to gas-liquid chromatographic packed columns, polyphenyl thioethers of this invention can also be used in capillary columns in which the internal surfaces of the column are coated with the partitioning liquid.

Typical examples of the polyphenyl thioethers of this invention are

Bis(o-phenylmercaptophenyl) sulfide
Bis(m-phenylmercaptophenyl) sulfide
Bis(p-phenylmercaptophenyl) sulfide
Bis(o-phenylmercaptophenyl) sulfide
Bis(p-phenylmercaptophenyl) sulfide
1,2,3-tris(phenylmercapto)benzene
1,2,4-tris(phenylmercapto)benzene
1,3,5-tris(phenylmercapto)benzene
o-Bis(o-phenylmercaptophenylmercapto)benzene
m-Bis(m-phenylmercaptophenylmercapto)benzene
p-Bis(p-phenylmercaptophenylmercapto)benzene
p-Bis(o-phenylmercaptophenylmercapto)benzene
p-Bis(m-phenylmercaptophenylmercapto)benzene
m-Bis(p-phenylmercaptophenylmercapto)benzene
o-Bis(p-phenylmercaptophenylmercapto)benzene
ar-Bis(phenylmercapto)-ar'-(phenylmercapto)benzene
Bis[m-(m-phenylmercaptophenylmercapto)phenyl] sulfide
Bis[p-(p-phenylmercaptophenylmercapto)phenyl] sulfide
Bis[p-(m-phenylmercaptophenylmercapto)phenyl] sulfide
p-Bis[p-(p-methylphenylmercaptophenylmercapto)phenyl] sulfide
Bis[p-(p-a-cumylphenylmercapto)phenyl] sulfide
Bis[p-(p-(p-bromophenylmercapto)phenylmercapto)phenyl] sulfide
m-Bis[m-(m-phenylmercaptophenylmercapto)phenylmercapto]benzene
m-Bis[m-(p-phenylmercaptophenylmercapto)phenylmercapto]benzene
Bis[p-(p-(p-phenylmercaptophenylmercapto)phenylmercapto)phenyl] sulfide
Bis[m-(m-(m-phenylmercaptophenylmercapto)phenylmercapto)phenyl] sulfide
m-Phenoxydiphenyl sulfide
p-Phenoxydiphenyl sulfide
o-Phenoxydiphenyl sulfide
Bis(p-phenylmercaptophenyl) ether
Bis(m-phenylmercaptophenyl) ether
m-Phenylmercaptophenyl p-phenylmercaptophenyl ether
m-Phenylmercaptophenyl m-phenoxyphenyl sulfide
m-Bis(m-phenylmercaptophenoxy)benzene
3-(m-phenylmercaptophenylmercapto)-3'-phenoxy diphenyl ether
m-Bis(m-phenoxyphenylmercapto)benzene
3-phenylmercapto-3'-(m-phenylmercaptophenylmercapto)diphenyl ether
3-phenylmercapto-3'-(p-phenoxyphenoxy)diphenyl sulfide
Bis[m-(m-phenylmercaptophenoxy)phenyl] sulfide
o-Phenylmercapto-p'-phenoxydiphenyl sulfide
o-Phenylmercapto-m'-phenoxydiphenyl sulfide
o-Phenoxy-m'-phenylmercaptodiphenyl sulfide
m-Phenoxy-p'-phenylmercaptodiphenyl sulfide
o-Phenoxy-p'-phenylmercaptodiphenyl sulfide
p-Phenoxy-p'-phenylmercaptodiphenyl sulfide
o-Phenoxy-o'-phenylmercaptodiphenyl sulfide
o,o'-Bis(phenylmercapto)diphenyl ether
o-Phenylmercapto-m-phenylmercaptodiphenyl ether
o-Phenylmercapto-p-phenylmercaptodiphenyl ether
m-(m-Phenylmercaptophenylmercapto)(m-phenoxyphenylmercapto)benzene
[m-(m-Phenylmercaptophenylmercapto)phenyl][m-(m-phenoxyphenylmercapto)phenyl] sulfide
3-(m-phenylmercaptophenylmercapto)-3'-(m-phenylmercaptophenoxy)diphenyl sulfide
3,3'-bis(m-phenylmercaptophenylmercapto)diphenyl ether
3-(m-phenylmercaptophenylmercapto)-3'-(m-phenoxyphenoxy)diphenyl sulfide
4-(m-phenylmercaptophenylmercapto)-4'-(m-phenylmercaptophenoxy)diphenyl ether
3-(m-phenylmercaptophenylmercapto)-3'-(m-phenoxyphenylmercapto)diphenyl ether
4,4'-bis(m-phenylmercaptophenoxy)diphenyl sulfide
4,4'-bis(m-phenoxyphenylmercapto)diphenyl sulfide
3-(m-phenoxyphenylmercapto)-3'-(m-phenylmercaptophenoxy)diphenyl sulfide
3,3'-bis(m-phenylmercaptophenoxy)diphenyl ether
4-(m-phenylmercaptophenylmercapto)-4'-(m-phenoxyphenoxy)diphenyl ether
3-(p-phenylmercaptophenoxy)-3'-(p-phenoxyphenoxy)diphenyl sulfide
3-(m-phenylmercaptophenoxy)-3'-(m-phenoxyphenylmercapto)diphenyl ether
3,3'-bis(m-phenoxyphenylmercapto)diphenyl ether
3-(m-phenoxyphenylmercapto)-3'-(m-phenoxyphenoxy)-diphenyl sulfide
1-phenoxy-3,5-bis(phenylmercapto)benzene
1-phenylmercapto-3,5-bis(phenoxy)benzene
1-phenoxy-2,5-bis(phenylmercapto)benzene
2,2'-bis(phenylmercapto)biphenyl
3,3'-bis(phenylmercapto)biphenyl
4,4'-bis(phenylmercapto)biphenyl
3-phenylmercapto-3'-phenoxybiphenyl
2-(m-phenoxy-m-phenylmercapto)biphenyl
2,2',4-tris(phenylmercapto)biphenyl
2,4-bis(phenylmercapto)-2'-phenoxybiphenyl
2,2',4,4'-tetra(phenylmercapto)biphenyl
2,2',3,3',4,4'-hexa(phenylmercapto)biphenyl A further understanding of the present invention will be readily apparent to those skilled in the art from consideration of FIGS. 1 through 6.

In addition to FIGS. 1 through 6, the following examples further illustrate the present invention.

EXAMPLE 1

Figure 1:
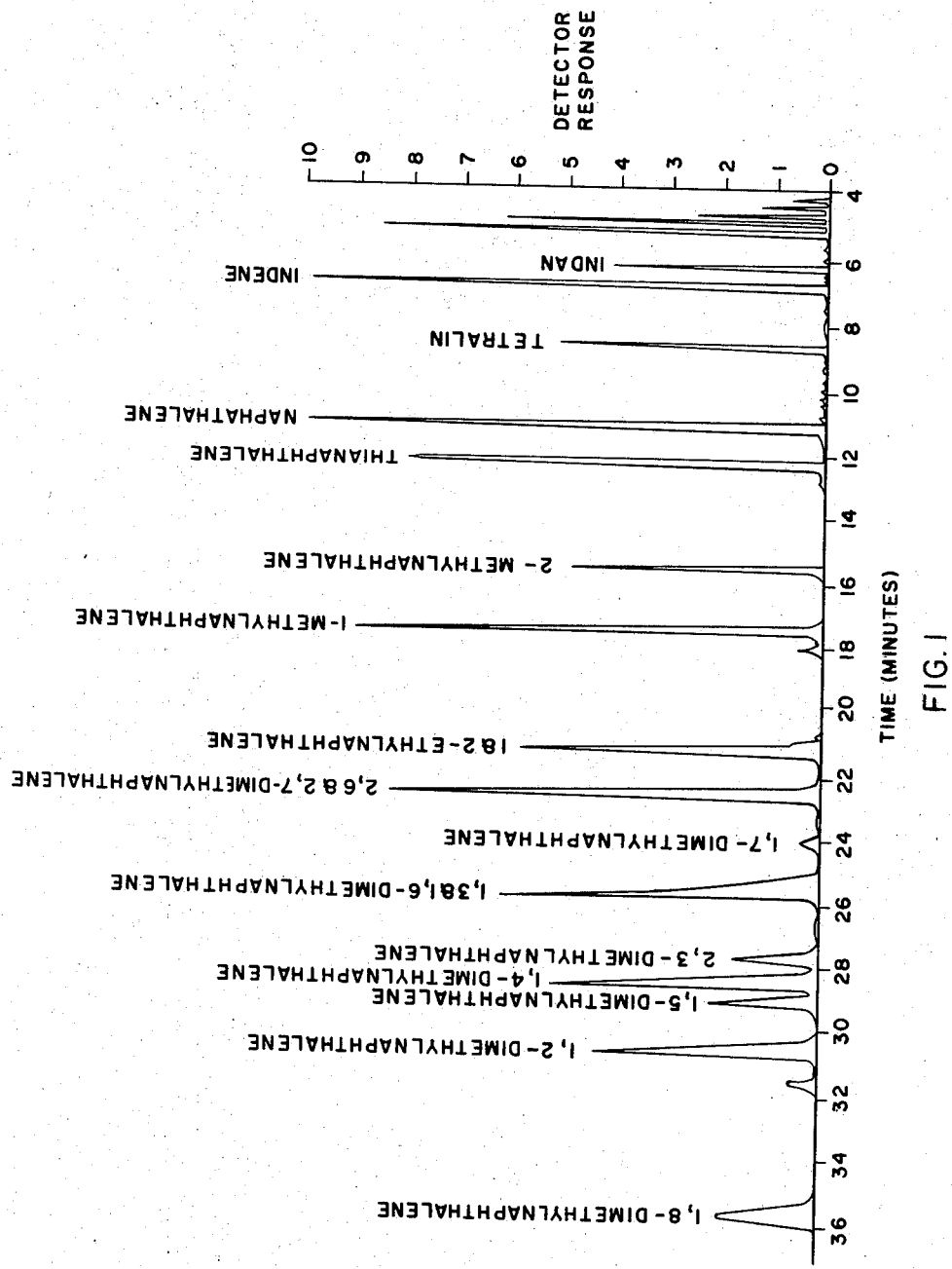
FIG. 1 is a chromatogram resulting from the analysis of a mixture of alkylnaphthalenes using a polyphenyl thioether of this invention.

A 200-foot length of stainless steel tubing having an inside diameter of 0.01 inch was washed by forcing 20 ml. of methylene chloride through it under 75 p.s.i.g. gas pressure followed in similar manner by 20 ml. of acetone. The column was dried by purging with nitrogen for 15 minutes. A coating solution was prepared by dissolving 1 gram of 3,3'-bis(m-phenylmercaptophenoxy)diphenyl sulfide in 9 grams of methylene chloride. This solution was forced through the capillary tubing under 25 p.s.i.g. nitrogen pressure. The column was then purged with nitrogen at 15 p.s.i.g. for 1 hour to evaporate the solvent. The resulting column was used to analyze a mixture of alkylnaphthalenes by gas-liquid chromatography using a 1 microliter sample with an inlet splitter flow of 250 ml. per minute and a column flow of 2.8 ml. per minute of nitrogen. The column temperature was 170° C. and a flame ionization detector was used. The chromatogram was complete in 40 minutes and showed well-shaped peaks with complete separation of the 2,3-, 1,4- and 1,5-dimethylnaphthalene trio and resolution of a minor unknown component just after the 1-methylnaphthalene peak (FIG. 1).

EXAMPLE 2

Figure 2:
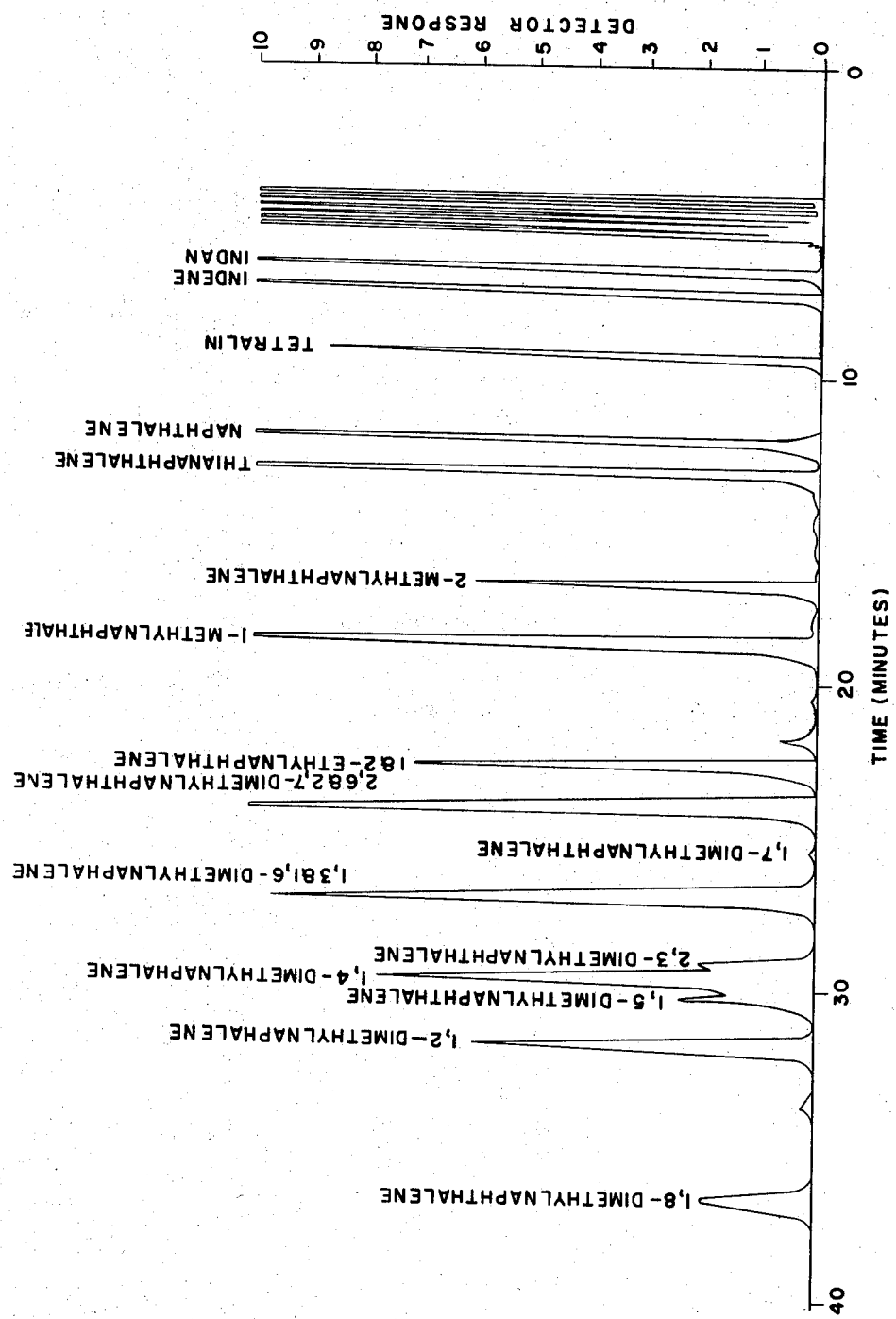
FIG. 2 is a chromatogram resulting from the analysis of the same mixture of alkylnaphthalenes used to provide FIG. 1 but using as the absorbent of polyphenyl ether (a prior art material).
Figure 3:
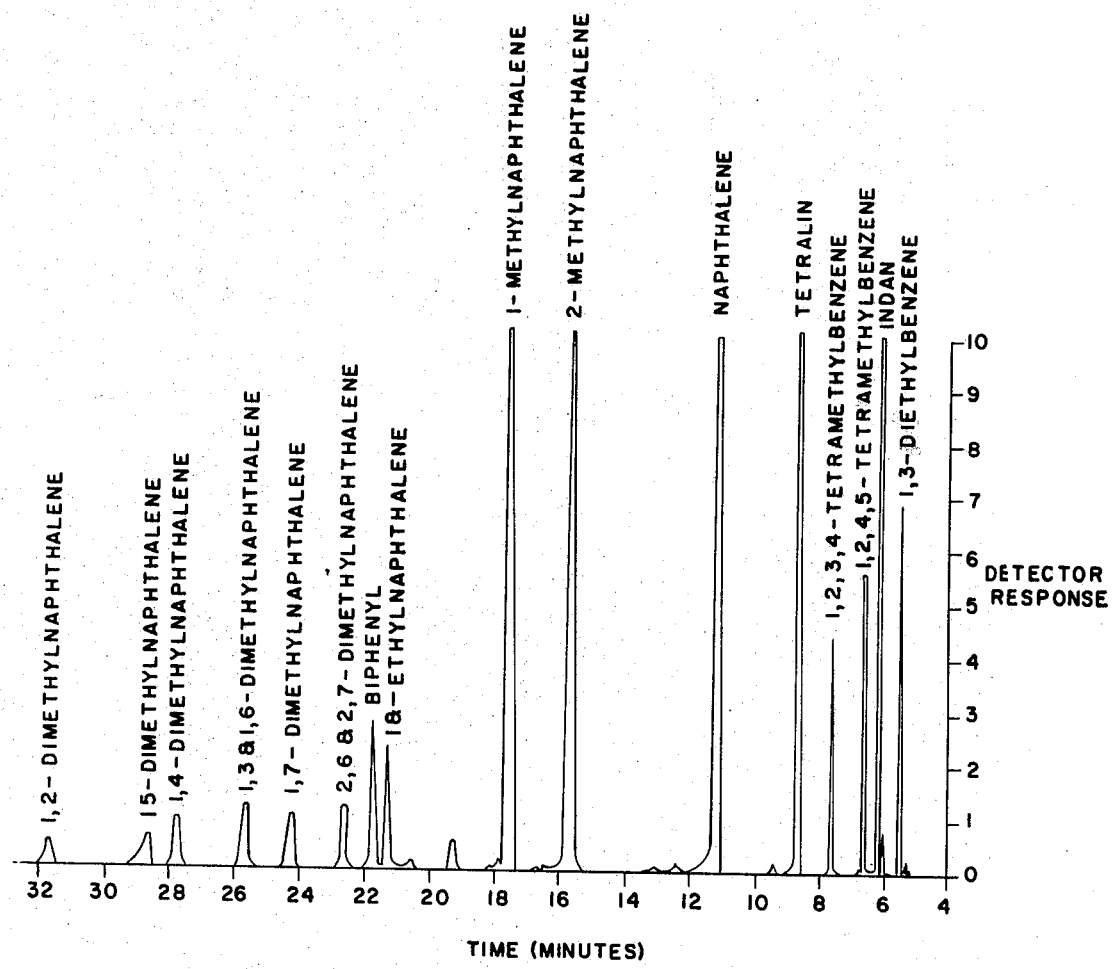
FIG. 3 is a chromatogram resulting from the analysis of a mixture of naphthalenes and biphenyl using a polyphenyl thioether of this invention.
Figure 4:
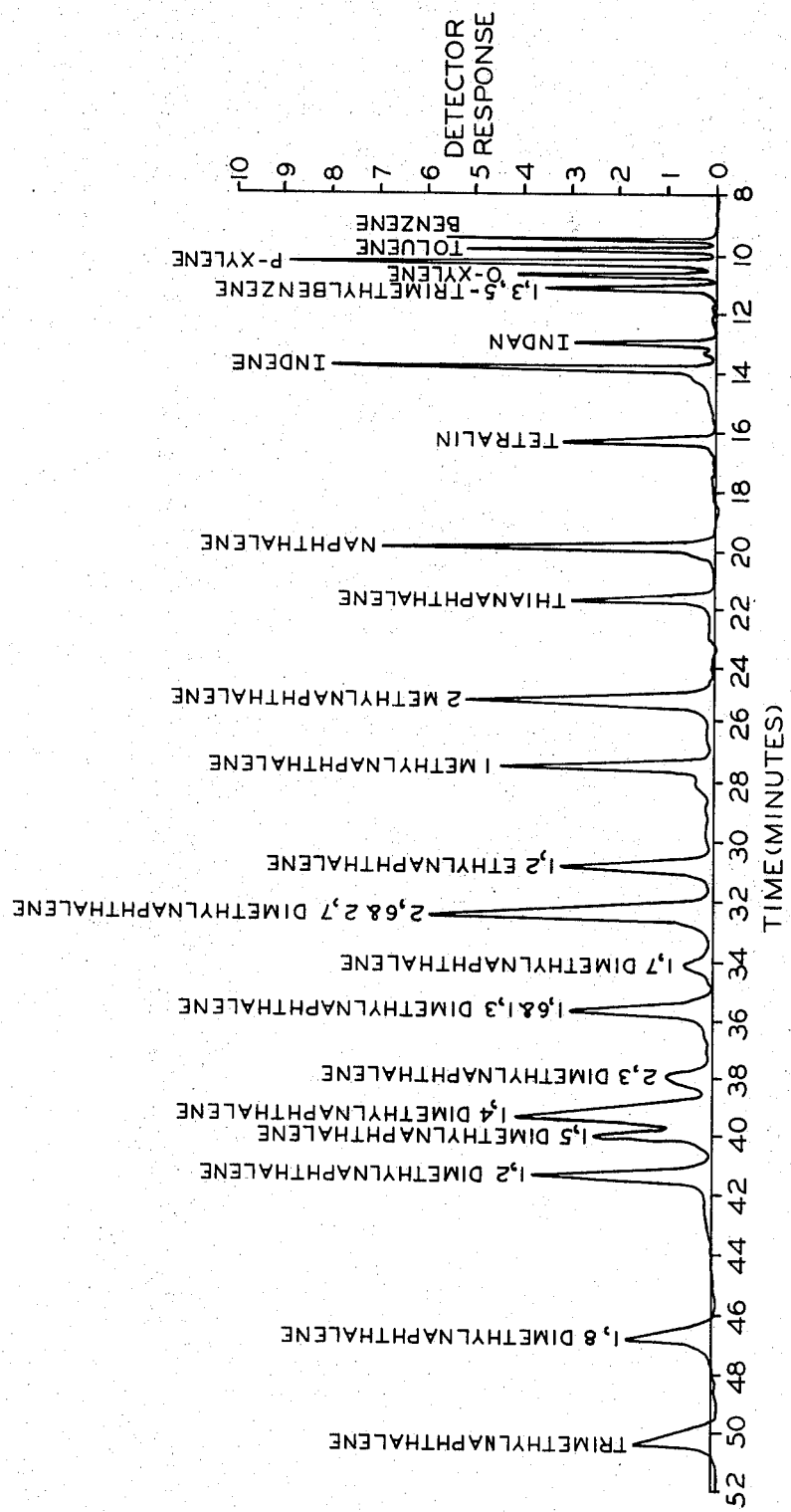
FIG. 4 is a chromatogram resulting from the analysis of a mixture of the alkylnaphthalenes used to provide FIGS. 1 and 2 using a polyphenyl thioether of this invention as the absorbent.
Figure 5:
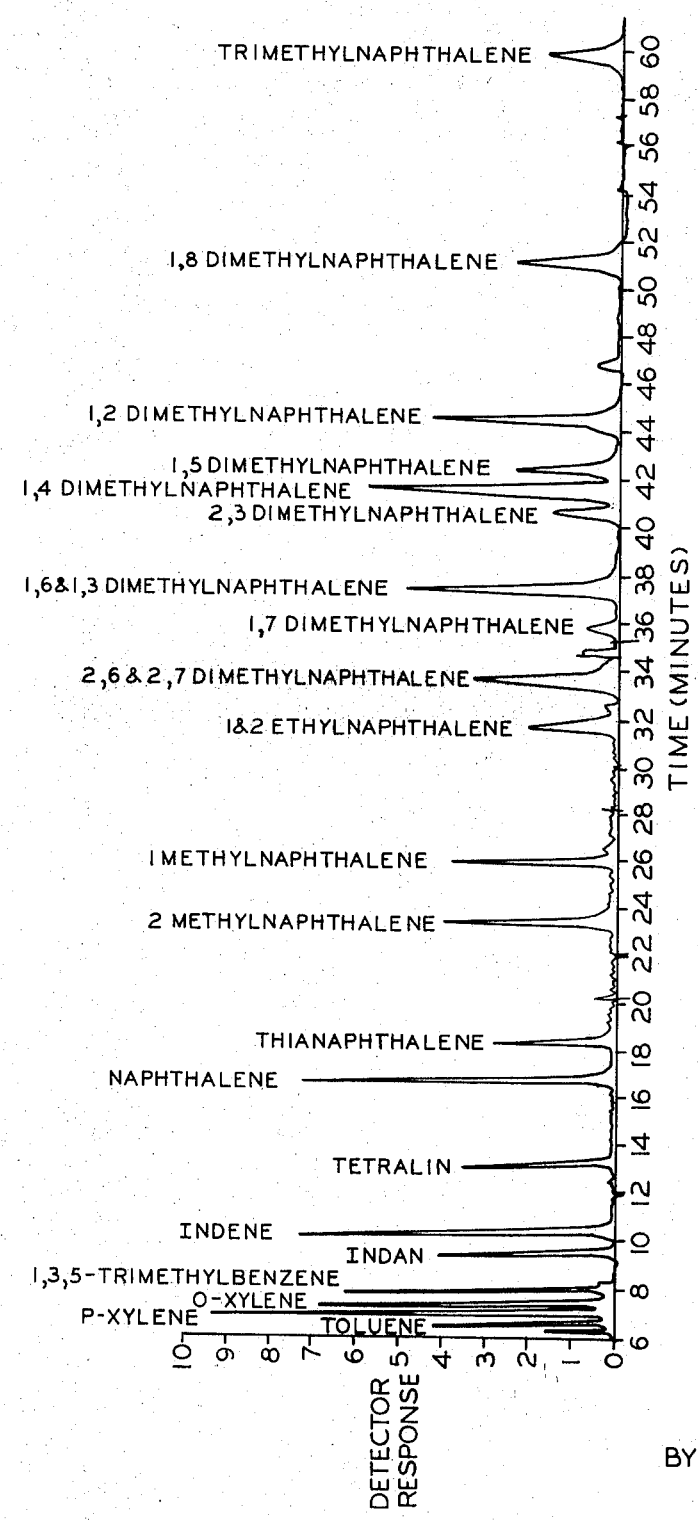
FIG. 5 is a chromatogram resulting from the analysis of a mixture of the alkylnaphthalenes used to provide FIGS. 1, 2 and 4 using a polyphenyl thioether of this invention as the absorbent.
Figure 6:
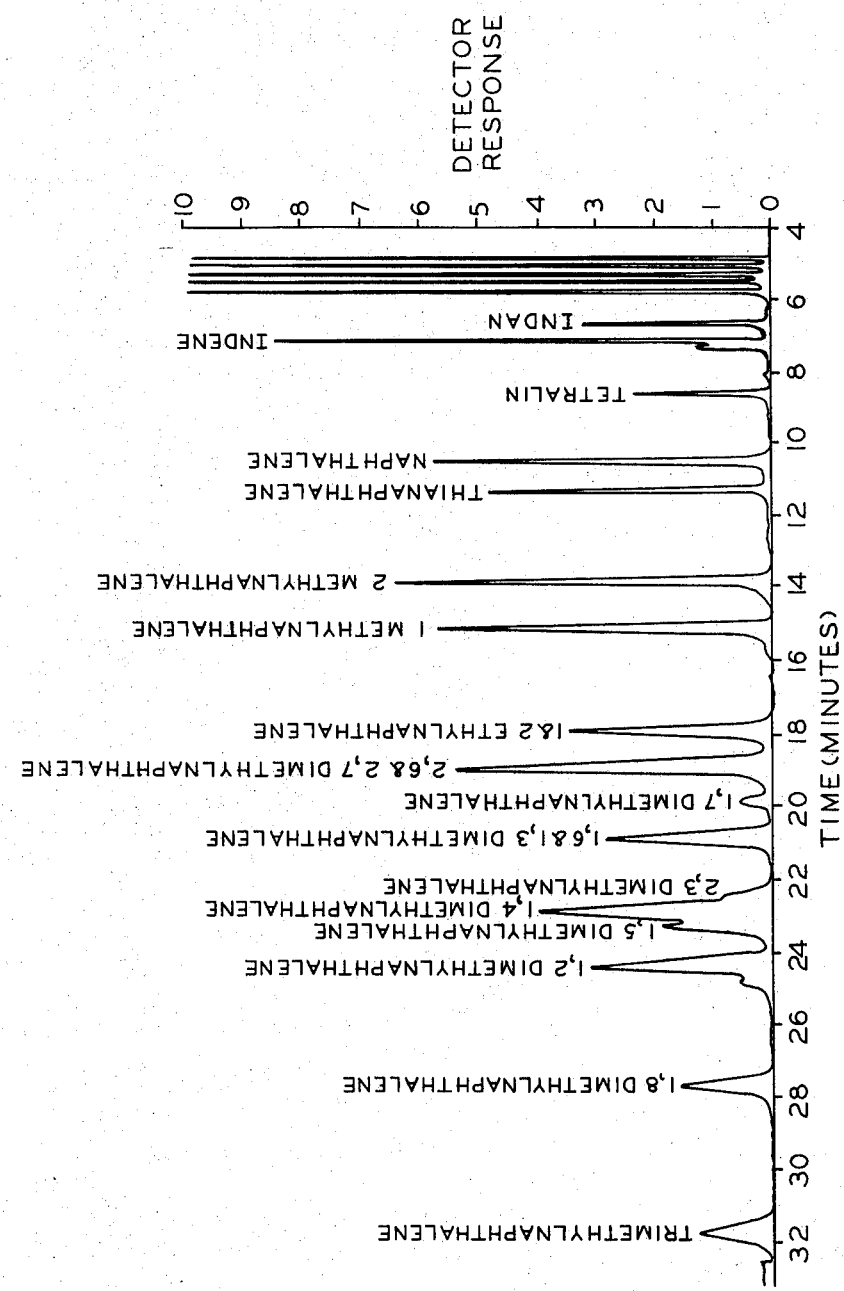
FIG. 6 is a chromatogram resulting from the analysis of a mixture of the alkylnaphthalenes used to provide FIGS. 1, 2, 4 and 5 using a polyphenyl thioether of this invention.

A mixture of alkylnaphthalene having the same composition as the mixture analyzed in Example 1 was chromatographed under the same conditions as in Example 1 on a similar 200-foot length of capillary tubing coated in identical fashion with a solution of 1 gram of m-bis[m-(m-phenoxyphenoxy)phenoxy]-benzene in 9 grams of methylene chloride. The resulting chromatogram did not separate the 2,3-, 1,4- and 1,5-dimethylnaphthalene trio and did not resolve the minor unknown component from 1-methylnaphthalene (FIG. 2).

EXAMPLE 3

A 1 ml. sample of a mixture of naphthalenes and biphenyl was chromatographed under the same conditions and with the same column as used in Example 1. The resulting chromatogram (FIG. 3) shows complete resolution of the 2,6- and 2,7-dimethylnaphthalene combined peak from biphenyl. In addition to nitrogen as the carrier gas, other conventional gases can be used in the method of this invention, such as argon, helium and hydrogen.

EXAMPLE 4

A mixture of alkylnaphthalenes having the same composition as the mixture analyzed in Example 1 was chromatographed under the same conditions as in Example 1 on a similar 200-foot length of capillary tubing coated in identical fashion with a solution of 1 gram of 3,3'-bis(m-phenylmercaptophenylmercapto)diphenyl sulfide in 9 grams of methylene chloride. The resulting chromatogram (FIG. 4) shows complete resolution of 1,4-, 1,5- and 2,3-dimethylnaphthalenes.

EXAMPLE 5

A mixture of alkylnaphthalenes having the same composition as the mixture analyzed in Example 1 was chromatographed under the same conditions as in Example 1 on a similar 200-foot length of capillary tubing coated in identical fashion with a solution of 1 gram of m-bis(m-phenoxyphenylmercapto)benzene in 9 grams of methylene chloride. The resulting chromatogram (FIG. 5) shows complete resolution of 1,4-, 1,5- and 2,3-dimethylnaphthalenes.

EXAMPLE 6

A mixture of alkylnaphthalenes having the same composition as the mixture analyzed in Example 1 was chromatographed under the same conditions as in Example 1 on a similar 200-foot length of capillary tubing coated in identical fashion with a solution of 1 gram of 3,3'-bis-(phenylmercapto)diphenyl in 9 grams of methylene chloride. The resulting chromatogram (FIG. 6) shows complete resolution of 1,4-, 1,5- and 2,3-dimethylnaphthalenes.

The embodiments of this invention in which an exclusive property or privilege is claimed are defined as follows:

1. In a method of separating components of a methylnaphthalenes-containing mixture by gas-liquid chromatography, the improvement comprising utilizing as the liquid phase a polyphenyl thioether.

2. In a method of claim 1 where the polyphenyl thioether is represented by the structure

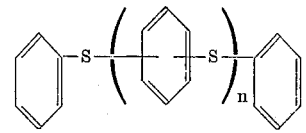

where $n$ is a whole number from 3 to 7.

3. In a method of claim 1 where the polyphenyl thioether is represented by the structure

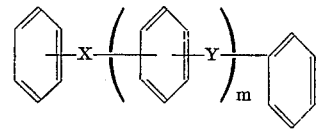

where $m$ is a whole number from 3 to 7 and X and Y are each O or S, at least one of X or Y being O; provided, however, that the number of the S's in the sum of $X+Y$ is at least one-third of such sum and preferably at least one-half of such sum.

4. In a method of claim 1 where the polyphenyl thioether is represented by the structure

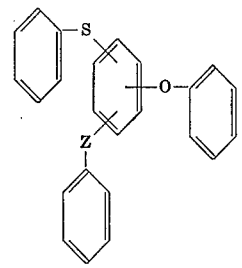

where Z is O or S.

5. In a method of claim 1 where the polyphenyl thioether is represented by the structure

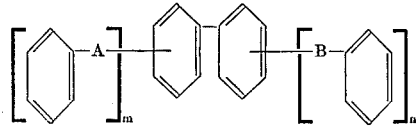

where A and B are each independently O or S provided that the number of S atoms in the sum of $A+B$ is at least one-third and preferably one-half of such sum and $m$ and $n$ are whole numbers from 0 to 3 and the sum of $m+n$ is from 2 to 6.

6. In a method of claim 3 where the number of sulfur linkages in the sum of $x+y$ is at least one-half of such sum.

7. In a method of claim 3 where the polyphenyl thioether is 3,3'-bis(m-phenylmercaptophenoxy)diphenyl sulfide.

8. In the method of claim 2 where the polyphenyl thioether is an all-meta-linked polyphenyl thioether.

9. In the method of claim 3 where the polyphenyl thioether is an all-meta-linked polyphenyl thioether.

References Cited

UNITED STATES PATENTS 3,311,665   3/1967   Campbell et al. _____ 260—609

OTHER REFERENCES

West, W. W., "The Analysis of Polyphenyl Radiolysis Products by Gas Chromatography and Other Methods," Gas Chromatography Abstracts, 1964, pp. 38–39.

Weingarten, H., "Electronic Effects in the Gomberg Reaction," J. Org. Chem., 25, 1066–67, (1960).

Weingarten, H., "Steric Effects in the Gomberg Reaction," J. Org. Chem., 26, 730–33, (1961).

Weingarten, H., "Aluminum Chloride-Induced Isomerization of Chlorinated Biphenyls," J. Org. Chem., 27, 2024-26, (1962).

JAMES L. DeCESARE, Primary Examiner

U.S. Cl. X.R.

260—609